(12) United States Patent
Habraken et al.

(10) Patent No.: US 10,030,110 B2
(45) Date of Patent: Jul. 24, 2018

(54) COMPOSITE PLASTIC PART WITH IMPROVED RESISTANCE TO HEAT AGING

(71) Applicant: BASF SE, Ludwigshafen (DE)

(72) Inventors: Gijsbrecht Habraken, Budd Lake, NJ (US); Manoranjan Prusty, Mannheim (DE); Andreas Radtke, Mannheim (DE); Gaurav Ramanlal Kasaliwal, Mannheim (DE)

(73) Assignee: BASF SE, Ludwigshafen (DE)

( * ) Notice: Subject to any disclaimer, the term of this patent is extended or adjusted under 35 U.S.C. 154(b) by 344 days.

(21) Appl. No.: 14/913,223

(22) PCT Filed: Aug. 18, 2014

(86) PCT No.: PCT/EP2014/067587
§ 371 (c)(1),
(2) Date: Feb. 19, 2016

(87) PCT Pub. No.: WO2015/024911
PCT Pub. Date: Feb. 26, 2015

(65) Prior Publication Data
US 2016/0200081 A1 Jul. 14, 2016

(30) Foreign Application Priority Data
Aug. 21, 2013 (EP) ..................................... 13181151

(51) Int. Cl.
| | | |
|---|---|---|
| *C08J 5/10* | (2006.01) | |
| *B29C 45/14* | (2006.01) | |
| *B32B 27/08* | (2006.01) | |
| *B29C 45/16* | (2006.01) | |
| *B32B 27/12* | (2006.01) | |
| *B32B 27/28* | (2006.01) | |
| *B32B 27/34* | (2006.01) | |
| *B29K 77/00* | (2006.01) | |
| *B29K 79/00* | (2006.01) | |

(52) U.S. Cl.
CPC ........... *C08J 5/10* (2013.01); *B29C 45/14778* (2013.01); *B29C 45/1671* (2013.01); *B32B 27/08* (2013.01); *B32B 27/12* (2013.01); *B32B 27/28* (2013.01); *B32B 27/34* (2013.01); *B29C 45/14311* (2013.01); *B29C 45/14786* (2013.01); *B29K 2077/00* (2013.01); *B29K 2079/00* (2013.01); *B32B 2250/24* (2013.01); *C08J 2377/02* (2013.01); *C08J 2377/06* (2013.01)

(58) Field of Classification Search
CPC .. C08J 5/10; B29C 45/14778; B29C 45/1671; B32B 27/08; B32B 27/12; B32B 27/28
See application file for complete search history.

(56) References Cited

U.S. PATENT DOCUMENTS

| | | | |
|---|---|---|---|
| 4,144,123 A | 3/1979 | Scharf et al. | |
| 4,371,674 A | 2/1983 | Hertel et al. | |
| 4,537,949 A | 8/1985 | Schmidt et al. | |
| 4,540,772 A | 9/1985 | Pipper et al. | |
| 5,536,370 A | 7/1996 | Scherr et al. | |
| 5,641,855 A | 6/1997 | Scherr et al. | |
| 6,063,286 A | 5/2000 | Steuerle et al. | |
| 2012/0004353 A1* | 1/2012 | Prusty ..................... | C08L 77/00 524/236 |
| 2012/0108122 A1 | 5/2012 | Elia et al. | |
| 2012/0108123 A1 | 5/2012 | Elia et al. | |
| 2012/0108124 A1 | 5/2012 | Elia et al. | |
| 2012/0108125 A1 | 5/2012 | Elia et al. | |
| 2012/0108126 A1 | 5/2012 | Elia et al. | |
| 2012/0108127 A1 | 5/2012 | Yuan et al. | |
| 2012/0108128 A1 | 5/2012 | Elia et al. | |
| 2012/0108129 A1 | 5/2012 | Elia et al. | |
| 2012/0108130 A1 | 5/2012 | Yuan et al. | |
| 2012/0108131 A1 | 5/2012 | Elia et al. | |
| 2012/0108136 A1 | 5/2012 | Elia et al. | |
| 2012/0214904 A1 | 8/2012 | Prusty et al. | |

FOREIGN PATENT DOCUMENTS

| | | |
|---|---|---|
| DE | 199 31 720 A1 | 1/2001 |
| EP | 0 025 515 A1 | 3/1981 |
| EP | 0 129 195 A2 | 12/1984 |
| EP | 0 129 196 A2 | 12/1984 |

(Continued)

OTHER PUBLICATIONS

International Search Report dated Sep. 10, 2014 in PCT/EP2014/067587.
Marco Wacker, et al., "Schweißen and Umspritzen von Organoblechen" KU-Kunststoffe, vol. 92, 2002, pp. 78-81.
R. Stolze, "Impragniertechniken fur aramidund kohlenstoffaserverstarkte Thermoplaste" Kunststoffe, vol. 78, 1988, pp. 126-131.
David N. Roark, et al., "Aziridines" Ullmann's Encyclopedia of Industrial Chemistry, 2000, pp. 1-8.
Ulrich Steuerle, et al., "Aziridines" Ullmann's Encyclopedia of Industrial Chemistry, vol. 4, 2000, pp. 515-522.

*Primary Examiner* — John E Uselding
(74) *Attorney, Agent, or Firm* — Oblon, McClelland, Maier & Neustadt, L.L.P.

(57) ABSTRACT

The present invention relates to a process for producing a plastic composite component (CC) in which a first fiber material (F1) is impregnated with a polyamide matrix polymer (PAM) to obtain a matrix composition (MC), to which a surface composition (SC) is applied, and a first plastic component (C1) is obtained. In a second step, a second plastic component (C2) is molded onto the first plastic component (C1), giving the plastic composite component (CC). The invention further relates to the plastic composite component (CC) obtainable by the process of the invention. The present invention further provides for the use of polyethyleneimine (PEI) for improving the impregnation of the first fiber material (F1) with the polyamide matrix polymer (PAM).

13 Claims, No Drawings

(56) References Cited

FOREIGN PATENT DOCUMENTS

| | | |
|---|---|---|
| EP | 0 675 914 | 10/1995 |
| EP | 0 895 521 | 2/1999 |
| WO | WO 94/12560 A1 | 6/1994 |
| WO | WO 94/14873 A1 | 7/1994 |
| WO | WO 97/40088 A1 | 10/1997 |
| WO | WO 2010/076145 A1 | 7/2010 |
| WO | WO 2011/051123 A1 | 5/2011 |
| WO | WO 2012/058345 A1 | 5/2012 |
| WO | WO 2012/058359 A1 | 5/2012 |
| WO | WO 2012/058366 A1 | 5/2012 |
| WO | WO 2012/058379 A2 | 5/2012 |
| WO | WO-2012058345 A1 * | 5/2012 ............. B32B 5/024 |

\* cited by examiner

COMPOSITE PLASTIC PART WITH IMPROVED RESISTANCE TO HEAT AGING

The present invention relates to a plastic composite component (CC) which has a first plastic component (C1) and optionally a second plastic component (C2) and a polyethyleneimine (PEI) for improving the thermal aging resistance of the plastic composite component. The present invention further relates to a process for producing this plastic composite component (CC), to a process for improving thermal aging resistance of the plastic composite component and to the use of polyethyleneimine (PEI) for improving the thermal aging resistance of the plastic composite component.

Fiber-reinforced plastics have become established over many years as materials which are used as a substitute for metal parts in many fields of use. Fiber-reinforced plastic panels are therefore also referred to as organosheets. The use of fiber-reinforced plastics is intended to reduce the weight of the materials used and the production costs for materials. In fiber-reinforced plastic components, it is customary for a glass fiber, carbon fiber or aramid fiber in the form of a laid scrim or a woven fabric to be surrounded by a polymer. The fiber-reinforced plastic parts thus obtained are producible inexpensively, are light compared to comparable metal parts and are notable for good mechanical properties.

For the first fiber-reinforced plastic parts thermoset polymers were used as polymer components. In order to achieve greater freedom of configuration with regard to the processing and further processing and to the moldings producible with fiber-reinforced plastics, fiber-reinforced plastics comprising thermoplastics as polymer component have been developed.

Fiber-reinforced moldings of this kind are produced using, for example, thermoplastic polyamides such as PA6 or PA66 in the form of glass fiber-reinforced molding compositions. For this purpose, the molding compositions are shaped by injection molding in a mold closed on all sides, which gives the actual moldings, i.e. the fiber-reinforced plastic parts. Moldings of this kind are frequently used as construction materials for components exposed to elevated temperatures during their lifetime. This results in thermooxidative damage to the moldings. The thermooxidative damage results in deterioration, for example, in the mechanical properties of the moldings and the visual appearance thereof, WO 2010/076145 describes thermoplastic molding compositions having improved thermal aging stability (TAR). The thermoplastic molding compositions described in WO 2010/076145, as well as a polyamide and a fiber material for reinforcement, comprise polyethyleneimine and iron powder. WO 2011/051123 also describes thermoplastic molding compositions having improved thermal aging stability (TAR) and comprising, as well as a polyamide and optionally a fiber material for reinforcement, iron powder having a particle size of not more than 10 μm ($D_{50}$), The molding compositions described in WO 2010/076145 and WO 2011/051123 are processed further to give moldings already having good thermal aging stabilities (TAR). There is no disclosure in WO 2010/076145 and WO 2011/051123 of plastic composite components comprising, as first plastic component, a fiber-reinforced matrix composition and a surface composition, and optionally comprising a second plastic component molded thereon.

In order to further increase freedom of configuration and design options, fiber-reinforced plastics can be processed further by welding and insert molding, in order to produce plastic composite components comprising, as first plastic component, a fiber-reinforced matrix composition and a surface composition, and optionally comprising a second plastic component. The welding and insert molding of continuous fiber-reinforced flat plastic parts is described, for example, in Marco Wacker et al., "*Schweißen und Umspritzen von Organoblechen*" [Welding and Insert Molding of Organosheets], KU-Kunststoffe, Karl Hanser Verlag Munich, volume 92 (2002), 6. By means of the processes for in-mold coating and insert molding described therein, it is possible to mount functional elements onto the fiber-reinforced flat plastic parts. For this purpose, the fiber-reinforced flat plastic is preheated before being inserted into the mold and then insert-molded with a second polymer.

In order to achieve a good bond between the first plastic part and the second polymer which is injected into the mold, it is necessary, as described above, to preheat the first plastic element. For the preheating, it is possible to use, for example, infrared sources or ovens. The preheating softens the first plastic element and may partly melt it at the surface. The heating can also be effected outside the mold. It is also possible to conduct the heating directly within the mold. In this way, deformation of the softened first plastic element can be avoided.

In order to achieve sufficiently high bond strength (adhesion) between the first plastic element and the second plastic element, sufficiently deep partial melting of the surface of the first plastic element is necessary to give rise to a stable weld bond. Because of the preferred heating of the first plastic element in the mold, a high cycle time is required before the finished molding can be removed from the mold, since removal is generally not possible until the polymer of the first plastic element and the polymers which are injected into the molding as a component of the second plastic element have solidified to such an extent that the molding is dimensionally stable. For this purpose, the mold is typically cooled prior to the removal of the finished molding.

However, the above-described plastic composite components do not have satisfactory thermal aging resistance.

Plastic composite components having improved thermal aging resistance are described, for example, in WO 2012/058366, WO 2012/058359 and WO 2012/058379. These plastic composite components comprise a combination of a surface thermal stabilizer and a matrix thermal stabilizer. The first thermal stabilizer is copper-based, preference being given to copper halides or copper acetate in combination with alkali metal halides, A second thermal stabilizer used is a polyhydric alcohol, preference being given to dipentaerythritol, tripentaerythritol, pentaerythritol and mixtures of these alcohols.

The plastic composite components described in WO 2012/058366, WO 2012/058359 and WO 2012/058379 are still in need of improvement with regard to the thermal aging resistance thereof.

It is thus an object of the present invention to provide a plastic composite component (CC) having improved or at least equivalent thermal aging resistance as compared with the plastic composite components described in the prior art. The plastic composite component is to be producible in a simple and inexpensive manner and have good mechanical properties. Furthermore, the plastic composite component is to have good adhesion between the first and second plastic components.

The object is achieved by a plastic composite component (CC) comprising
i) a first plastic component (C1) comprising
  ia) a matrix composition (MC) comprising a polyamide matrix polymer (PAM) and at least one first fiber material (F1) for reinforcement, and ib) a surface composition (SC) which comprises a polyamide surface polymer (PAS) and forms a surface of C1,
wherein
the surface composition (SC) comprises a polyethyleneimine (PEI) for improving the thermal aging resistance of the plastic composite component (CC), and wherein the matrix composition (MC) does not comprise any polyethyleneimine (PEI).

The present invention also provides a plastic composite component (CC) comprising
i) a first plastic component (C1) comprising
  ia) a matrix composition (MC) comprising a polyamide matrix polymer (PAM) and at least one first fiber material (F1) for reinforcement, and
  ib) a surface composition (SC) which comprises a polyamide surface polymer (PAS) and forms a surface of C1,
  wherein
    the surface composition (SC) comprises a polyethyleneimine (PEI) for improving the thermal aging resistance of the plastic composite component (CC).

It has been found that, surprisingly, the use of polyethyleneimine (PEI) in the surface composition (SC) leads to an improvement in the thermal aging resistance (TAR) of the plastic composite component (CC). The plastic composite components (CC) of the invention thus have good mechanical properties, especially very good thermal aging resistance (TAR), The plastic composite components (CC) are producible in a simple and inexpensive manner.

The present invention therefore also provides a process for producing a plastic composite component (CC), comprising the following steps:
a) providing a first plastic component (C1) comprising
  ia) a matrix composition (MC) comprising a polyamide matrix polymer (PAM) and at least one first fiber material (F1) for reinforcement,
  and
  ib) a surface composition (SC) which comprises a polyamide surface polymer (PAS) and forms a surface of C1,
  and
b) molding a second plastic component (C2) comprising a polyamide molding polymer (PAA) onto the surface of C1,
wherein
SC and optionally C2 comprise a polyethyleneimine (PEI) for improving the thermal aging resistance of the plastic composite component (CC).

The present invention also further provides for the use of polyethyleneimine (PEI) for improving the thermal aging resistance (TAR) of a plastic composite component (CC), wherein CC
i) a first plastic component (C1) comprising
  ia) a matrix composition (MC) comprising a polyamide matrix polymer (PAM) and at least one first fiber material (F1) for reinforcement,
  and
  ib) a surface composition (SC) which comprises a polyamide surface polymer (PAS) and forms a surface of C1,
  wherein
    the surface composition (SC) comprises a polyethyleneimine (PEI) for improving the thermal aging resistance of the plastic composite component (CC).

The present invention further provides a plastic composite component (CC) comprising a second plastic component (C2) molded onto the surface of the first plastic component (C1). The present invention thus also provides a plastic composite component (CC) comprising
i) a first plastic component (C1) comprising
  ia) a matrix composition (MC) comprising a polyamide matrix polymer (PAM) and at least one first fiber material (F1) for reinforcement, and
  ib) a surface composition (SC) which comprises a polyamide surface polymer (PAS) and forms a surface of C1, and
ii) a second plastic component (C2) which comprises a polyamide molding polymer (PAA) and has been molded onto the surface of C1,
wherein
SC comprises a polyethyleneimine (PEI) for improving the thermal aging resistance of the plastic composite component (CC).

The present invention also provides a process for improving the thermal aging resistance of a plastic composite component (CC), comprising the following steps:
a) providing a first plastic component (C1) comprising
  ia) a matrix composition (MC) comprising a polyamide matrix polymer (PAM) and at least one first fiber material (F1) for reinforcement, and
  ib) a surface composition (SC) which comprises a polyamide surface polymer (PAS) and forms a surface of C1, and
b) molding a second plastic component (C2) comprising a polyamide molding polymer (PAA) onto the surface of C1,
  wherein
    the surface composition (SC) comprises a polyethyleneimine (PEI) for improving the thermal aging resistance of the plastic composite component (CC).

In a preferred embodiment of the process for producing a plastic composite component (CC), of the use of polyethyleneimine (PEI) for improving thermal aging resistance (TAR), of the plastic composite component (CC) and of the process for improving the thermal aging resistance (TAR) of the plastic composite component (CC), the matrix composition (MC) does not comprise any polyethyleneimine (PEI).

The details and preferences which follow with regard to the plastic composite component (CC) apply correspondingly to the process for production thereof, to the use of polyethyleneimine (PEI) for improving thermal aging resistance and to the process for improving thermal aging resistance.

Plastic Composite Component (CC); First Plastic Component (C1)

The first plastic component (C1) is also referred to hereinafter as C1 for short, The matrix composition (MC) is also referred to hereinafter as MC for short. The polyamide matrix polymer (PAM) is also referred to hereinafter as PAM for short. The first fiber material (F1) is also referred to hereinafter as F1 for short. The surface composition (SC) is also referred to hereinafter as SC for short. The polyamide surface polymer (PAS) is also referred to hereinafter as PAS for short.

Matrix Composition (MC)

The matrix composition (MC) comprises a polyamide matrix polymer (PAM) and at least one first fiber material (F1) for reinforcement. In the present context, the term "a polyamide matrix polymer (PAM)" is understood to mean either exactly one polyamide matrix polymer (PAM) or mixtures of two or more polyamide matrix polymers (PAM). The same applies to the term "at least one first fiber material (F1)". According to the invention, this is understood to mean either exactly one first fiber material (F1) or mixtures of two or more fiber materials (F1).

Polyamide Matrix Polymer (PAM)

The polyamide matrix polymer (PAM) used may, as explained above, be exactly one polyamide matrix polymer (PAM). It is also possible to use mixtures of two or more polyamide matrix polymers (PAM). Suitable polyamide matrix polymers (PAM) generally have a viscosity number of 90 to 350 mL/g, preferably of 110 to 240 mL/g. The viscosity number is determined from a 0.5% by weight solution of a polyamide matrix polymer (PAM) in 96% by weight sulfuric acid at 25° C. to ISO 307.

Preferred polyamide matrix polymers (PAM) are semicrystalline or amorphous polyamides. Suitable polyamide matrix polymers (PAM) have a weight-average molecular weight ($M_w$) in the range of from 500 to 2 000 000 g/mol. The average molecular weight ($M_w$) is determined by means of light scattering to ASTM D4001.

Suitable polyamide matrix polymers (PAM) are, for example, polyamides which derive from lactams having 7 to 13 ring members. Further suitable polyamide matrix polymers (PAM) are polyamides which are obtained by reaction of dicarboxylic acids with diamines.

Examples of polyamides which derive from lactams include those which derive from polycaprolactam, polycaprylolactam and/or polylaurolactam.

If polyamides obtainable from dicarboxylic acids and diamines are used, dicarboxylic acids used may be dicarboxylic acids alkanes having 6 to 36 carbon atoms, preferably 6 to 12 carbon atoms. Additionally suitable are aromatic dicarboxylic acids.

Examples of dicarboxylic acids include adipic acid, azelaic acid, sebacic acid, dodecanedicarboxylic acid and terephthalic acid and/or isophthalic acid.

Examples of suitable diamines are alkanediamines having 4 to 36 carbon atoms, especially alkanediamines having 6 to 12 carbon atoms, and aromatic diamines, for example m-xylylenediamine, di(4-aminophenyl)methane, di(4-aminocyclohexyl)methane, 2,2-di(4-aminophenyl)propane, 2,2-di(4-aminocyclohexyl)propane or 1,5-diamino-2-methylpentane.

Preferred polyamide matrix polymers (PAM) are polyhexamethyleneadipamide, polyhexamethylenesebacamide, polycaprolactam and nylon-6/6,6 copolyamide, especially having a proportion of 5% to 95% by weight of caprolactam units.

Further suitable PAMs are polyamides obtainable by copolymerizing two or more of the monomers mentioned above and below, and mixtures of two or more polyamides in any desired mixing ratio. Particular preference is given to mixtures of nylon-6,6 with other polyamides, especially nylon-6/6,6 copolyamide.

Further particularly advantageous PAMs have been found to be semiaromatic copolyamides such as PA 6/6T and PA 66/6T having a triamine content of less than 0.5% by weight and preferably less than 0.3% by weight.

Such semiaromatic copolyamides having a low triamine content can be prepared, for example, by the processes described in EP-A 129 195 and 129 196.

The non-comprehensive list which follows comprises the aforementioned polyamides and further polyamides which are suitable as PAMs, and the monomers present.

AB Polymers:
PA 4 pyrrolidone
PA 6 ε-caprolactam
PA 7 ethanolactam
PA 8 capryiolactam
PA 9 9-aminopelargonic acid
PA 11 11-aminoundecanoic acid
PA 12 laurolactam ANBB Polymers:
PA 46 tetramethylenediamine, adipic acid
PA 66 hexamethylenediamine, adipic acid
PA 69 hexamethylenediamine, azelaic acid
PA 610 hexamethylenediamine, sebacic acid
PA 612 hexamethylenediamine, decanedicarboxylic acid
PA 613 hexamethylenediamine, undecanedicarboxylic acid
PA 1212 dodecane-1,12-diamine, decanedicarboxylic acid
PA 1313 tridecane-1,13-diamine, undecanedicarboxylic acid
PA 6T hexamethylenediamine, terephthalic acid
PA MXD6 m-xylylenediamine, adipic acid
PA 61 hexamethylenediamine, isophthalic acid
PA 6-3-T trimethylhexamethylenediamine, terephthalic acid
PA 6/6T (see PA 6 and PA 6T)
PA 6/66 (see PA 6 and PA 66)
PA 6/12 (see PA 6 and PA 12)
PA 66/6/610 (see PA 66, PA 6 and PA 610)
PA 61/6T (see PA 61 and PA 6T)
PA PACM 12 diaminodicyclohexylmethane, laurolactam
PA 61/6TlPACM as PA 61/6T +diaminodicyclohexylmethane
PA 12/MACM1 laurolactam, dimethyldiaminodicyclohexylmethane, isophthalic acid
PA 12/MACMT laurolactam, dimethyldiaminodicyclohexylmethane, terephthalic acid
PA PDA-T phenyienediamine, terephthalic acid The present invention thus also provides a plastic composite component (CC) in which the polyamide matrix polymer (PAM) is at least one polyamide selected from the group consisting of PA 4, PA 6, PA 7, PA 8, PA 9, PA 11, PA 12, PA 46, PA 66, PA 69, PA 610, PA 612, PA 613, PA 1212, PA1313, PA 6T, PA MXD6, PA 61, PA 6-3-T, PA 6/6T, PA 6/66, PA 6/12, PA 66/6/610, PA 61/6T, PA PACM 12, PA 61/6T/PACM, PA 12/MACMI, PA 12/MACMT, PA PDA-T and copolyamides composed of two or more of the aforementioned polyamides.

Preferably, the polyamide matrix polymer (PAM) is a polyamide selected from the group consisting of nylon-6, nylon-6,6 and copolyamides of nylon-6 and nylon-6,6.

Preferably, the polyamide matrix polymer (PAM) is nylon-6.

In a further preferred embodiment, the polyamide matrix polymer (PAM) is nylon-6,6.

In a further preferred embodiment, the polyamide matrix polymer (PAM) is nylon-6/6,6.

The PAM may further comprise further customary additives, for example impact modifiers, lubricants, UV stabilizers and process stabilizers.

First Fiber Material (F1)

Examples of suitable materials for the first fiber material (F1) include carbon fibers, glass fibers, aramid fibers, potassium titanate fibers, boron fibers, mineral fibers (for example basalt fibers) and metallic fibers (for example steel fibers or copper fibers).

A preferred first fiber material (F1) is a continuous fiber material.

The present invention thus also provides a plastic composite component (CC) in which the first fiber material (F1) is a continuous fiber material.

The terms "continuous fiber material" and "continuous fiber" are used synonymously hereinafter. In the present context, a continuous fiber is understood to mean a linear structure according to DIN 60 000 of virtually unlimited length, which can be subjected to textile processing. A continuous fiber is also referred to as filament. The term "filament" is used in the textile industry, A filament (continuous fiber) is accordingly understood to mean a virtually endless fiber produced by a chemical or industrial route according to DIN 60 001 T 2 (December 1974).

If a continuous fiber material is used as first fiber material (F1), preference is given to continuous glass fibers. The continuous fibers may be used in the form of a loop-drawn knitted fabric, a loop-formed knitted fabric or a woven fabric. It is also possible to use unidirectional continuous fibers. Such single-thread continuous fibers are also referred to as monofils. If unidirectional continuous fibers are used, a multitude of continuous glass fibers used in parallel to one another is used. In this case, preference is given to using unidirectional layers of continuous fibers aligned parallel to one another.

Furthermore, it is possible to use bidirectional or multidirectional layers of continuous fibers. In this case, the first fiber material (F1) has an elemental unidirectional layer (UD layer). Above and/or below the elemental UD layer is disposed a further UD layer in which the direction of the continuous fibers is rotated by, for example, 90° relative to the fiber direction of the elemental UD layer. In the case of multidirectional layers, the first fiber material (F1) comprises a plurality of layers (for example three, four, five or six layers) in which the directions of the fibers in the particular layers are each rotated by 90°, for example, relative to one another. The angle with which the individual unidirectional layers are rotated relative to one another in bi- or multidirectional layers may vary within wide ranges, for example in the range from ±10° to ±90°.

If the first fiber material (F1) used is the preferred continuous fibers, the continuous fibers may each be used individually. It is also possible to weave the continuous fibers individually in each case or to weave individual continuous fiber bundles with one another. The continuous fibers may additionally be used in the form of a nonwoven or a felt. Suitable continuous fiber materials are known to those skilled in the art. Particularly preferred continuous fiber materials are glass fibers and carbon fibers. Especially preferred are continuous glass fibers and continuous carbon fibers having a fiber diameter in the range from 9 to 34 μm.

The matrix composition (MC) may, as well as the polyamide matrix polymer (PAM) and the first fiber material (F1), comprise further customary additives. Suitable additives are, for example, UV stabilizers, lubricants, nucleating agents, dyes, plasticizers. Suitable further additives are described, for example, in WO 2010/076145.

The surface composition (SC) and the second plastic component (C2) may also comprise further customary additives as described, for example, in WO 2010/076145.

The further additives are generally present in the matrix composition (MC) in amounts of 0% to 5% by weight, based on the total weight of the polyamide matrix material (PAM), or based on the total weight of the polyamide surface polymer (PAS) in the surface composition (SC) or based on the total weight of the polyamide molding polymer (PM) of the second plastic component (C2). The matrix composition (MC) may likewise further comprise a polyethyleneimine (PEI).

The present invention thus also provides a plastic composite component (CC) comprising a polyethyleneimine (PEI) in the matrix composition (MC). The present invention further provides a plastic composite component (CC) comprising a polyethyleneimine (PEI) in the surface composition (SC), in the matrix composition (MC) and in the second plastic component (C2).

In a further embodiment, SC, MC and C2 comprise the same polyethyleneimine (PEI).

It has been found that, surprisingly, the matrix composition (MC) need not necessarily comprise a polyethyleneimine (PEI) in order to obtain a plastic composite component (CC) having good thermal aging resistance. Plastic composite components (CC) comprising a polyethyleneimine (PEI) only in the surface composition (SC) and optionally in the second plastic component (PC) which has optionally been molded on have thermal aging resistances comparable to plastic composite components (CC) comprising a polyethyleneimine (PEI) both in the surface composition (SC) and optionally in the plastic component (C2) optionally molded on and in the matrix composition (MC).

The present invention thus also provides a plastic composite component (CC) in which the matrix composition (MC) does not comprise any polyethyleneimine (PEI).

This allows the production costs for the plastic composite component (CC) to be lowered. The expression "does not comprise any polyethyleneimine (PEI)" is understood in accordance with the invention to mean that no polyethyleneimine (PEI) is added to the matrix composition (MC). However, the matrix composition (MC) may comprise small amounts of polyethyleneimine (PEI) which are transferred during the process for producing the plastic composite component (CC) from the surface composition (SC) into the matrix composition (MC), If the matrix composition (MC) does not comprise any polyethyleneimine (PEI), the matrix composition (MC) comprises not more than 5% by weight, preferably not more than 1% by weight and especially preferably not more than 0.1% by weight of the total amount of the polyethyleneimine (PEI) present in the plastic composite component (CC).

The plastic composite component (CC) may, as well as polyethyleneimine (PEI), comprise iron powder (CIP). The combination of polyethyleneimine (PEI) and iron powder (CIP) results in plastic composite components (CC) having even further improved thermal aging resistance. The above details and preferences given with regard to the polyethyleneimine (PEI) apply correspondingly to the iron powder (CIP).

The present invention thus also provides a plastic composite component (CC) comprising iron powder (CIP) in the matrix composition (MC). The present invention further provides a plastic composite component (CC) comprising iron powder (CIP) in the surface composition (SC), in the matrix composition (MC) and in the second plastic component (C2).

It has been found that, surprisingly, the matrix composition (MC) need not necessarily comprise iron powder (CIP) in order to obtain a plastic composite component (CC) having good thermal aging resistance. Plastic composite components (CC) comprising iron powder (CIP) only in the surface composition (SC) and optionally in the second plastic component (PC) which has optionally been molded on have thermal aging resistances comparable to plastic composite components (CC) comprising iron powder (CIP) both in the surface composition (SC) and optionally in the plastic component (C2) optionally molded on and in the matrix composition (MC).

The present invention thus also provides a plastic composite component (CC) in which the matrix composition (MC) does not comprise any iron powder (CIP).

This allows the production costs for the plastic composite component (CC) to be lowered further. The expression "does not comprise any iron powder (CIP)" is understood in accordance with the invention to mean that no iron powder (CIP) is added to the matrix composition (MC). However, the matrix composition (MC) may comprise small amounts of iron powder (CIP) which are transferred during the process for producing the plastic composite component (CC) from the surface composition (SC) into the matrix composition (MC). If the matrix composition (MC) does not comprise any iron powder (CP), the matrix composition (MC) comprises not more than 5% by weight, preferably not more than 1% by weight and especially preferably not more than 0.1% by weight of the total amount of the iron powder (CIP) present in the plastic composite component (CC).

Thermal aging resistance (TAR) is determined by storing the plastic composite component (CC) at elevated temperatures, determining the mechanical properties of the plastic composite component (CC) before and after the storage. The characteristic parameter measured for the mechanical properties is the flexural strength of the plastic composite component (CC), The storage at elevated temperature is conducted in an air circulation oven. Flexural strength is measured to DIN EN ISO 14125:2011.

Surface Composition (SC)

The surface composition (SC) comprises a polyamide surface polymer (PAS) and forms a surface of the first plastic component (C1). In the present context, the term "a surface" is understood to mean either exactly one surface or two or more surfaces. In the present context, the term "a polyamide surface polymer (PAS)" is understood to mean either exactly one PAS or mixtures of two or more PASs.

The surface composition (SC) may form the surface of the first plastic component (C1) locally at a defined position. It is also possible that the surface composition (SC) completely surrounds the matrix composition (MC). In the preferred case of a flat plastic composite component (CC), the surface composition (SC) may form one surface on the top side of the matrix composition (MC) and/or on the bottom side of the matrix composition (MC).

If the surface composition (SC) forms a surface only on the top side or only on the bottom side of the matrix composition (MC), the surface composition (SC) forms 10% to 50% of the total surface area of the first plastic component (C1), preferably 30% to 50% and more preferably 40% to 50% of the total surface area of the first plastic component (C1).

If the surface composition (SC) forms a surface on the top side and the bottom side of the matrix composition (MC), the surface composition (SC) forms greater than 50% to 100% of the total surface area of the first plastic component (C1), preferably 80% to 100% and more preferably 90% to 100% of the total surface area of the first plastic component (C1).

Polyamide surface polymers (PAS) used may be polyamides as described above for the polyamide matrix polymer (PAM). The above details and preferences with regard to the polyamide matrix polymer (PAM) thus apply correspondingly to the polyamide surface polymer (PAS).

The polyamide surface polymer (PAS) generally does not comprise any fiber material (F1). The polyamide surface polymer (PAS) may optionally comprise further additives as described above for the polyamide matrix polymer (PAM). In a preferred embodiment, the surface composition (SC) does not comprise any fiber material (F1).

In a preferred embodiment, the surface composition (SC) comprises, as polyamide surface polymer (PAS), the same polyamide polymer as the polyamide matrix polymer (PAM). In a preferred embodiment, polyamide matrix polymer (PAM) and the polyamide surface polymer (PAS) are thus identical.

However, it is also possible to use, as polyamide surface polymer (PAS), a polyamide polymer different than the polyamide matrix polymer (PAM).

Production of the Plastic Composite Component (CC); First Plastic Component (C1)

If the first fiber material (F1) used is a continuous fiber material in the form of a mat, a nonwoven, a felt, a woven fabric, a loop-drawn knitted fabric or a loop-formed knitted fabric, the first plastic component (C1) is produced by impregnating the first fiber material (F1), generally with the polyamide matrix polymer (PAM). For the production, the polyamide matrix polymer (PAM), for example in the form of a melt, is contacted with the first fiber material (F1). A further means of producing the first plastic component (C1) is the powder impregnation or lamination of the first fiber material (F1) with films of the polyamide matrix polymer (PAM), followed by melting and pressing of the film(s) or of the powder applied, in order to produce the first plastic component (C1).

It is also possible to ensheath individual continuous fibers or yarns of continuous fibers with the polyamide matrix polymer (PAM), then to weave the ensheathed continuous fibers and then to heat the woven fabric in order to melt the polyamide matrix polymer (PAM) and to obtain the first plastic component (C1).

The different processes for producing the first plastic component (C1) are known in principle to those skilled in the art and are described, for example, in R. Stolze, Kunststoffe 78, 1988, pages 126 to 131, and in M. Wacker, G. W. Ehrenstein, C. Obermann, Kunststoffe 92, 2002, pages 78 to 81.

In one embodiment, the plastic component (C1) has a layered structure. This structure is also referred to as sandwich structure. In the case of a sandwich structure, the plastic component (C1) has a multitude of layers of the first fiber material (F1). A multitude is understood in the present context generally to mean 2 to 20 layers of the first fiber material (F1). In the sandwich structure, in a formal sense, there is at least one polymer layer between any two adjacent layers of the first fiber material (F1).

These polymer layers may be formed from the polyamide matrix polymer (PAM) or from the polyamide surface polymer (PAS). The general details and preferences in relation to C1, F1, PAM and PAS apply correspondingly to this embodiment. In the case of a sandwich structure, it may comprise 1 to 20, preferably 2 to 10 and more preferably 2 to 6 layers of the first fiber material (F1).

The production of such a sandwich structure is known per se to those skilled in the art and can be effected, for example, by laminating. The production is described hereinafter using the example of a sandwich structure having two layers of the first fiber material (F1). For this purpose, the materials are applied to one another in the sequence specified and then joined together, preferably under pressure while heating: a film of PAS, a layer of F1, a film of PAM, a layer of F1 and a film of PAS. The joining can be effected, for example, with heating under pressure. For this purpose, the aforementioned materials can be fed, for example, to a heatable roller press in which the joining is effected.

The heating in the joining operation results in melting of the polyamide matrix polymer (PAM) used as middle layer. As a result, the adjacent layers of the first fiber material (F1) are impregnated by the polyamide matrix polymer (PAM), The above-described illustrative process affords, as plastic component (C1), a sandwich structure having the following layer structure:

PAS, F1, PAM, F1 and PAS.

In the course of heating and pressing, the matrix composition (MC) is formed from the polyamide matrix polymer (PAM) film and the two layers of the first fiber material (F1), The sandwich structure obtained as first plastic component (C1) thus has, in a formal sense, the following layer structure: PAS, F1, PAM, F1 and PAS. The matrix composition (MC) forms here in a formal sense from F1, PAM and F1. The matrix composition thus consists of fiber material (F1) impregnated on both sides with the polyamide matrix polymer (PAM) in between. Depending on the degree of heating and the pressure expended, the two mats of the first fiber material (F1) in the first plastic component (C1) may be in contact.

The polyethyleneimine (PEI) is generally added to the polyamide matrix polymer (PAM) and/or to the polyamide surface polymer (PAS). For this purpose, customary mixing apparatuses, for example extruders, are used. It is also possible to add the polyethyleneimine (PEI) to the polyamide matrix polymer (PAM) and/or to the polyamide surface polymer (PAS) only in the course of production of the plastic component (C1). Preferably, the polyethyleneimine (PEI) is added only to the polyamide surface polymer (PAS).

If the plastic composite component (CC) comprises iron powder (CIP), the iron powder (CIP) is generally added to the polyamide matrix polymer (PAM) and/or the polyamide surface polymer (PAS). For this purpose, customary mixing apparatuses, for example extruders, are used, It is also possible to add the iron powder (CIP) to the polyamide matrix polymer (PAM) and/or to the polyamide surface polymer (PAS) only in the course of production of the plastic component (C1). Preferably, the iron powder (CIP) is added only to the polyamide surface polymer (PAS).

If further additives are used, these are generally likewise distributed in the respective polyamide polymer by suitable mixing apparatuses.

The plastic composite component (CC) generally comprises 0.01% to 5% by weight of a polyethyleneimine (PEI), based on the total weight of the plastic composite component (CC), The plastic composite component (CC) preferably comprises 0,1% to 1% by weight of polyethyleneimine (PEI), based on the total weight of the plastic composite component (CC).

The present invention thus also provides a plastic composite component (CC) in which the plastic composite component (CC) comprises 0,01% to 5% by weight of polyethyleneimine (PEI), based on the total weight of the plastic composite component (CC).

Polyethyleneimines (PEIs) are understood in the context of the present invention to mean both homo- and copolymers obtainable, for example, by the processes in Ullmann (Electronic Release) under the heading "Aziridines" or according to WO-A 94/12560.

The homopolymers are generally obtainable by polymerizing ethyleneimine (aziridine) in aqueous or organic solution in the presence of acid-eliminating compounds acids or Lewis acids. Homopolymers of this kind are branched polymers generally comprising primary, secondary and tertiary amino groups in a ratio of about 30% to 40% to 30%, The distribution of the amino groups can generally be determined by means of $^{13}C$ NMR spectroscopy. The latter is preferably 1:0.8:0.5 to 1:1.3:8, especially 1:1.1:0.8 to 1:1.

The present invention thus also provides a plastic composite component (CC) in which the polyethyleneimine (PEI) comprises primary, secondary and tertiary amino groups, where the ratio of primary to secondary to tertiary amino groups is in the range from 1:0.8:0.5 to 1:1.3:0.8.

Comonomers used are preferably compounds having at least two amino functions. Suitable comonomers include, for example, alkylenediamines having 2 to 10 carbon atoms in the alkylene radical, preference being given to ethylenediamine and propylenediamine. Further suitable comonomers are diethylenetriamine, triethylenetetramine, tetraethylenepentamine, dipropylenetriamine, tripropylenetriamine, dihexamethylenetriamine, aminopropylethylenediamine and bisaminopropylethylenediamine.

Polyethyleneimines (PEIs) typically have a weight-average molecular weight $M_w$ of 600 to 3 000 000, preferably 700 to 2 000 000. The preferred $M_w$ is 800 to 50 000, especially from 1100 to 25 000. The weight-average molecular weight $M_w$ is determined by means of light scattering to ASTM D4001.

The present invention thus also provides a plastic composite component (CC) in which the polyethyleneimine (PEI) has a weight-average molecular weight $M_w$ in the range from 600 to 300 000 g/mol.

Additionally suitable are crosslinked polyethyleneimines (PEIs) obtainable by reaction of polyethyleneimines (PEIs) with bi- or polyfunctional crosslinkers having, as functional group, at least one halohydrin, glycidyl, aziridine or isocyanate unit or a halogen atom. Examples include epichlorohydrin or bichlorohydrin ethers of polyalkylene glycols having 2 to 100 ethylene oxide and/or propylene oxide units, and the compounds detailed in DE-A 19 93 17 20 and U.S. Pat. No. 4,144,123. Processes for preparing crosslinked polyethyleneimines (PEIs) are known inter alia from the abovementioned specifications, and also EP-A 895 521 and EP-A 25 515.

Additionally suitable are grafted polyethyleneimines (PE's), where grafting agents used may be all compounds which can react with the amino or imino groups of the polyethyleneimines (PEIs), Suitable grafting agents and processes for preparing grafted polyethyleneimines (PEIs) can be found, for example, in EP-A 675 914.

Likewise suitable polyethyleneimines (PEIs) in the context of the invention are amidated polymers typically obtainable by reaction of polyethyleneimines (PEIs) with carboxylic acids, esters or anhydrides thereof, carboxamides or carbonyl halides. According to the proportion of amidated nitrogen atoms in the polyethyleneimine chain, the amidated polymers may subsequently be crosslinked with the crosslinkers mentioned. Preferably, it is possible here for up to 30% of the amino functions to be amidated, in order that sufficient primary and/or secondary nitrogen atoms are available for a subsequent crosslinking reaction.

Also suitable are alkoxylated polyethyleneimines (PEIs) obtainable, for example, by reaction of polyethyleneimine (PEI) with ethylene oxide and/or propylene oxide. Alkoxylated polymers of this kind are subsequently crosslinkable as well.

Further suitable polyethyleneimines (PEIs) of the invention include hydroxyl-containing polyethyieneimines (PEIs) and amphoteric polyethyleneimines (PEIs) (incorporation of anionic groups), and also lipophilic polyethyleneimines (PEIs) which are generally obtained by incorporation of long-chain hydrocarbyl radicals into the polymer chain. Processes for producing polyethyleneimines (PEIs) of this kind are known to those skilled in the art.

Preferred polyethyleneimines (PEIs) are hyperbranched polyethyleneimines (PEIs). The term "hyperbranched" in the context of the present invention means that the degree of branching (DB) of the polyethyleneimine (PEI) is in the range from 10% to 99%, preferably in the range from 50% to 99% and more preferably in the range from 60% to 99%, DB is defined as $$DB(\%)=100\times(T+Z)/(T+Z+L)$$

where T is the mean number of terminal-bonded monomer units, Z is the mean number of monomer units that form branches and L is the mean number of linear-bonded monomer units in the polyethyleneimine (PEI).

The present invention thus also provides a plastic composite component (CC), wherein the polyethyleneimine (PEI) is a hyperbranched polymer having a degree of branching DB in the range from 10% to 99%, where DB is defined as $DB(\%)=100\times(T+Z)/(T+Z+L)$ where T is the mean number of terminal-bonded monomer units, Z is the mean number of monomer units that form branches and L is the mean number of linear-bonded monomer units in the polyethyleneimine (PEI).

If the plastic composite component (CC) comprises iron powder (CIP), it is generally present in the plastic composite component (CC) in amounts in the range from 0.01% to 20% by weight, preferably in the range from 0.05% to 10% by weight and especially in the range from 0.1% to 5% by weight, based in each case on the total weight of the plastic composite component (CC).

Suitable iron powder (CIP) is, for example, iron powder as described in WO 2010/076145 or WO 2001/051123.

Iron occurs in several allotropes:
1. α-Fe (ferrite) forms body-centered cubic lattices, is magnetizable, dissolves little carbon, and occurs in pure iron up to 928° C. At 770° C. (Curie temperature) it loses its ferromagnetic properties and becomes paramagnetic; iron in the temperature range from 770 to 928° C. is also referred to as β-Fe. At standard temperature and a pressure of at least 13 000 MPa, α-Fe is converted to what is called ε-Fe with a reduction in volume of about 0.20 cm$^3$/mol, with an increase in density from 7.85 to 9.1 (at 20 000 MPa).
2. γ-Fe (cf. austenite) forms face-centered cubic lattices, is nonmagnetic, dissolves a large amount of carbon and is observed only within the temperature range from 928 to 1398° C.,
3. δ-Fe, body-centered, exists between 1398° C. and the melting point of 1539° C.

Metallic iron is generally silvery white, density 7.874 (heavy metal), melting point 1539° C., boiling point 2880° C., specific heat (between 18 and 100° C.) about 0.5 g$^{-1}$ K, tensile strength 220 to 280 N/mm$^2$. The values apply to chemically pure iron.

Iron is obtained by reduction of iron oxides with hydrogen at low temperature as a chemically pure powder, by thermal breakdown of iron pentacarbonyi according to Fe(CO)$_5$→Fe+5CO at 150 to 250° C. as a very pure powder carbonyl iron or by electrolysis of iron(II) chloride solution or iron(II) sulfate solution with insoluble graphite or a soluble anode made from sheet iron or cast iron. By deposition of iron(II) sulfate solution in sulfuric acid at mercury cathodes and subsequent refining, it is possible to obtain 99.99% iron. On the industrial scale, iron is produced by smelting of iron ores, iron slags, pyrite cinders and blast furnace dust, and by remelting of scrap metal and alloys.

Preferred iron powder (CIP) has a median particle size $d_{50}$ of not more than 450 μm, especially 20 to 250 μm, most preferably of 30 to 100 μm (to ASTM D 1921-89, Method A).

Products of this kind are available, for example, as SCM IronPowder A 131 from SCM Metal Products.

Preferably, the iron powder (CIP) of the invention is produced by thermal decomposition of iron pentacarbonyi, preferably at temperatures of 150° C. to 350° C. The particles obtainable here have a preferably spherical shape, i.e. a round or nearly round shape (also referred to as spherolitic).

Preferred iron powder (CIP) has a particle size distribution as described below, the particle size distribution being determined by means of laser diffraction in a highly dilute aqueous suspension (for example with a Beckmann LS13320 instrument). Optionally, the particle size (and distribution) described hereinafter can be adjusted by grinding or/and sieving.

In this context, $d_{xx}$=XX % of the total volume of the particles is less than the value.
$d_{50}$ values: max. 10 μm, preferably 1.6 to 8 μm, especially 2.9 to 7.5 μm, very particularly 3.4 to 5.2 μm
$d_{10}$ values: preferably 1 to 5 μm, especially 1 to 3 μm and very particularly 1,4 to 2.7 μm
$d_{90}$ values: preferably 3 to 35 μm, especially 3 to 12 μm Preferably, the iron powder (CIP) has an iron content of 97 to 99.8 g/100 g, preferably of 97.5 to 99.6 g/100 g, of iron powder (CP). The content of further metals is preferably below 1000 ppm, especially below 100 ppm and very particularly below 10 ppm.

The Fe content is typically determined by infrared spectroscopy.

The C content is preferably 0.01 to 1.2 g/100 g, preferably 0.05 to 1.1 g/100 g and especially 0.4 to 1.1 g/100 g. This C content, in the case of the preferred iron powders, corresponds to those which are not reduced with hydrogen after the thermal decomposition. The C content is typically determined by combustion of the sample quantity in an oxygen stream and subsequent IR detection of the CO$_2$ gas formed (by means of a Leco CS230 or CS-mat 6205 from Juwe) in accordance with ASTM E 1019.

The nitrogen content is preferably max. 1.5 g/100 g, more preferably from 0.01 to 1.2 g/100 g. The oxygen content is preferably max. 1.3 g/100 g, more preferably 0.3 to 0.65 g/100 g. N and O are determined by heating the sample in a graphite furnace to about 2100° C. The oxygen present in the sample here is converted to CO and measured by means of an IR detector. The N released under the reaction conditions is discharged together with the carrier gas and detected and captured by means of a TCD (thermal conductivity detector) (both methods in accordance with ASTM E1019).

The tapped density of the iron powder (CIP) is preferably 2.5 to 5 g/cm$^3$, especially 2.7 to 4.4 g/cm$^3$. This is generally understood to mean the density when the powder, for example, is introduced into the container and shaken in order to achieve compaction.

Further preferred iron powders may be surface coated with iron phosphate, iron phosphite or SiO$_2$.

The BET surface area of the iron powder (CIP) to DIN ISO 9277 is preferably from 0.1 to 10 m$^2$/g, especially 0.1 to 5 m$^2$/g, preferably 0.2 to 1 m$^2$/g and especially 0.4 to 1 m$^2$/g.

Second Plastic Component (C2)

The present invention also provides a plastic composite component (CC) in which the plastic composite component (CC) additionally comprises ii) a second plastic component (C2) which comprises a polyamide molding polymer (PAA) and has been molded onto the surface of C1.

The second plastic component (C2) comprises a polyamide molding polymer (PAA). In the present context, the term "a polyamide molding polymer (PAA)" is understood to mean either exactly one PAA or mixtures of two or more PAAs, Polyamide molding polymers (PAAs) used may generally be polyamides which can also be used as polyamide matrix polymer (PAM). The details relating to the polyamide matrix polymer (PAM) and the preferences mentioned in that context thus apply correspondingly to the polyamide molding polymer (PAA).

The polyamide molding polymer (PAA) used may be the same polyamide as for the polyamide matrix polymer (PAM). It is also possible to use a polyamide different than the polyamide matrix polymer (PAM) for the polyamide molding polymer (PAA).

The polyamide molding polymer (PAA) may also comprise further customary additives as described above for PAS and PAM.

The polyamide molding polymer (PAA) may likewise comprise a polyethyleneimine (PEI). Preferably, both SC and C2 comprise a polyethyleneimine (PEI).

The present invention thus also provides a plastic composite component (CC) in which SC and C2 comprise polyethyleneimine (PEI).

C2 may comprise the same polyethyleneimine (PEI) as the SC. It is also possible that C2 comprises a polyethyleneimine (PEI) different than SC. The details and preferences for the polyethyleneimine (PEI) as given above for the surface composition (SC) apply correspondingly to C2. C2 may additionally also comprise iron powder (CIP). The details and preferences given above for the iron powder (CIP) apply correspondingly to C2.

The present invention thus also provides a plastic composite component (CC) in which SC and/or C2 comprise(s) iron powder (CIP).

The polyethyleneimine (PEI) is preferably likewise mixed into the polyamide molding polymer (FAA). If iron powder (CIP) is used, it is preferably likewise mixed into the polyamide molding polymer (PAA). For this purpose, it is possible to use known mixing apparatuses, for example extruders. Preferably, the second plastic component (C2) likewise comprises a fiber material for reinforcement.

Suitable materials for this second fiber material (F2) include, merely by way of example, carbon fibers, glass fibers, aramid fibers, potassium titanate fibers, boron fibers, mineral fibers (for example basalt fibers) and metallic fibers (for example steel fibers or copper fibers).

Continuous fibers are unsuitable as second fiber material (F2). Preferred second fiber materials (F2) are glass fibers (short glass fibers). These glass fibers may be mixed into a polyamide melt, for example, with an extruder.

The present invention thus also provides a plastic composite component (CC) in which C2 comprises a second fiber material (F2), the second fiber material (F2) being a short fiber material.

Second fiber materials (F2) used are preferably fibers which can be mixed into the polyamide molding polymer (PAA) by means of suitable mixing apparatuses. The second plastic component (C2) may optionally comprise further additives. Further additives used may be additives mentioned above for MC or SC.

Molding of the Second Plastic Component (C2)

The first plastic component (C1) is generally placed into a mold. It is possible here, for example, to premold the first plastic component (C1) in an upstream step in a first mold and subsequently to place the premolding thus produced into the mold. This is possible especially when the first plastic component (C1) is a flat plastic element.

Alternatively, it is also possible to form the first plastic component (C1) directly in the mold. However, it is preferable to premold the first plastic component (C1) in a first mold and subsequently to place the premolding into the mold.

In addition, it is possible to heat the first plastic component (C1) before placing it into the mold or alternatively to heat the first plastic component (C1) in the mold. In particular, it is preferable to preheat the first plastic component (C1) and to place the preheated first plastic component (C1) into the mold.

Preferably, the mold has a temperature in the range from 40 to 210° C., especially in the range from 80 to 120° C. The first plastic component (C1) is preferably heated before being inserted into the mold to a temperature of 30 to 190° C., especially in the range from 120 to 170° C.

After inserting the first plastic component (C1), the second plastic component (C2) is introduced into the mold. In the course of this, the second plastic component (C2) is molded onto the surface of the first plastic component (C1). This molding operation is also referred to as "overmolding". In the context of the present invention, "molding" is understood to mean the partial molding of the second plastic component (C2) onto parts of the first plastic component (C1). In addition, "molding" is also understood to mean the complete or partial surrounding of the first plastic component (C1) by the second plastic component (C2).

In the molding operation, the second plastic component (C2) may be molded onto the first plastic component (C1) locally at defined positions. In addition, it is also possible to surround the first plastic component (C1) completely or partly with the second plastic component (C2).

In the molding operation, it is additionally possible to form additional functional elements from the second plastic component (C2) which are molded onto the surface of the first plastic component (C1).

For molding, the second plastic component (C2) is typically melted by methods known to those skilled in the art and injected into the mold. The use of the above-described polyethyleneimine (PEI), optionally in combination with iron powder (CIP), achieves improved thermal aging stability (TAR) of the plastic composite component (CC), Furthermore, improved adhesion is achieved between the first plastic component (C1) and the second plastic component (C2) in the plastic composite component (CC).

The present invention thus also provides a process for producing a plastic composite component (CC) in which, in step a), C1 is placed into a mold and, in step b), C2 is injected into the mold in the molten state.

The plastic composite component (CC) thus produced can subsequently be subjected to further processing steps. These include, for example, further forming steps and surface treatments of the plastic composite component (CC) in order to upgrade its surface.

In order to achieve a good bond between the first plastic component (C1) and the second plastic component (C2), it is advantageous when the temperature at the surface of the first plastic component (C1) is above the melting temperature of the polyamide surface polymer (PAS). For this purpose, the first plastic component (C1) is generally heated. The first plastic component (C1) can, as explained above, be heated directly in the mold. Alternatively, the first plastic component (C1) can also be heated outside the mold. The pressure with which the second plastic component (C2) is introduced into the mold depends on the flow direction of the melt of the second plastic component (C2). For this purpose, methods of injection molding and flow molding which are known per se to those skilled in the art are used and the pressures customary therein are observed.

The present invention is illustrated in detail by the examples which follow, but they do not restrict the invention thereto.

EXAMPLES

1. Production of the First Plastic Component (C1)

The first plastic component (C1) is produced using polyamides (PA6) having relative viscosities (RV) of 2.1 to 2.7 or polyamide (PA66) having a relative viscosity (RV) of 2.7, By means of an extruder, Lupasol WF from BASF SE or iron powder (CIP) is incorporated into these polyamides by compounding. Lupasol WF is a polyethyleneimine having CAS no.: 9002-98-6 with a molar mass of about 25 000 g/mol. The amounts of Lupasol WF used are reported in the tables which follow. The relative viscosity was measured to ISO 307. The iron powder (CIP) was added as a batch.

The amounts of Lupasol WF and the amounts of iron powder (CIP) are reported in percent by weight, based on the total weight of the polyamide used in the matrix composition (MC) or in the surface composition (SC), in each case without fiber material.

After production of the polyamide matrix polymer (PAM) comprising the stated amounts of Lupasol WF and amounts of iron powder (CIP) if appropriate, the resultant polyamide matrix polymer (PAM) was comminuted to a fine powder by grinding. This powder was subsequently applied to a woven continuous fiber mat (first fiber material (F1)) and melted. After production of the polyamide surface polymer (PAS) comprising the stated amounts of Lupasol WF and any amounts of iron powder (CIP), the resultant polyamide surface polymer (PAS) was comminuted to a fine powder by grinding. A further woven continuous fiber mat (first fiber material (F1)) was applied to the woven continuous fiber mat onto which the polyamide matrix polymer (PAM) had been melted. The powder of the polyamide surface polymer (PAS) was subsequently applied to the further woven continuous fiber mat and melted. Subsequently, the woven continuous fiber mats were treated under pressure and at a temperature above the melting temperature of the polyamide matrix polymer (PAM) and the polyamide surface polymer (PAS), in order to produce the first plastic component (C1).

The composition of the matrix composition (MC) and the surface composition (SC) of the first plastic part is reported in tables 1, 2 and 4 below.

A second plastic component (C2) was subsequently molded onto the first plastic component (C1) thus obtained. For this purpose, a polyamide (PA6) was used as polyamide molding polymer (PAA).

Lupasol WF was added to the second plastic component (C2) by means of an extruder. The amounts of Lupasol WF used and any amounts of iron powder (CIP) used are reported in tables 3 and 5. The weight data shown therein denote the percentages by weight, based on the total weight of the polyamide molding polymer (PAA) used.

For molding of the second plastic component (C2) onto the first plastic component (C1), the first plastic component (C1) was inserted into a mold and heated. The second plastic component (C2) was subsequently melted and injected into the mold.

The plastic component (C1) used was a specimen which had a surface area of 4×5 cm. A polymer component (C2) of length 4 cm and width 0.4 cm was molded onto this surface. The bonding surface area between C1 and C2 was thus 4×0.4 cm.

The compositions of the second plastic component (C2) are reported in tables 3 and 5.

To determine the thermal aging resistance (TAR) of the plastic composite components (CC/C1), the flexural strength of the plastic composite components (CC/C1) was measured before and after storage. Flexural strength was measured to DIN EN ISO 14125:2011.

The temperature and duration of thermal storage is reported in the tables. The thermal storage was conducted in an air circulation oven.

In the plastic composite components (CC/C1+C2), the adhesion between the plastic components was determined by measuring the tensile strength (MPa). The tensile strength was measured by a tensile test wherein the force needed to separate the plastic components (C1) and (C2) of the plastic composite component (CC/C1+C2) from one another was measured. For this purpose, the force was increased at a rate of 5 mm per minute.

The examples demonstrate that the adhesion between the first plastic component (C1) and the second plastic component (C2) is distinctly improved after thermal storage by the use of a poiyethyleneimine (PEI) when the surface composition (SC) of the first plastic component (C1) and/or the second plastic component (C2) comprises a polyethyleneimine (PEI).

TABLE 1

| CC/C1 examples: | 1 | 2 | 3 | 4 | 5 | 6 |
|---|---|---|---|---|---|---|
| SC: | | | | | | |
| PA6 (relative viscosity) | 2.2 | 2.2 | 2.7 | 2.7 | 2.2 | 2.7 |
| Lupasol WF | | 0.5 | | 0.5 | 0.5 | 0.5 |
| MC: | | | | | | |
| PA6 (relative viscosity) | 2.2 | 2.2 | 2.7 | 2.7 | 2.2 | 2.7 |
| Lupasol WF | | 0.5 | | 0.5 | | |
| Thermal aging temperature: | 180° C. | 180° C. | 180° C. | 180° C. | 180° C. | 180° C. |
| Decrease in flexural strength after 1000 h: | −20% | −1% | −22% | none | −1% | none |
| Decrease in flexural strength after 2000 h: | −27% | −12% | −25% | −11% | −11% | −12% |

TABLE 2

| CC/C1 examples: | 7 | 8 | 9 | 10 | 11 | 17 |
|---|---|---|---|---|---|---|
| SC: | | | | | | |
| PA6 (relative viscosity) | 2.7 | 2.2 | 2.2 | 2.7 | 2.7 | 2.7 |
| Lupasol WF | | 0.5 | 0.5 | 0.5 | 0.5 | 0.5 |
| Iron powder (CIP) | | | 1 | 1 | 1 | 1 |
| MC: | | | | | | |
| PA6 (relative viscosity) | 2.7 | 2.2 | 2.2 | 2.7 | 2.7 | 2.7 |
| Lupasol WF | | 0.5 | 0.5 | | 0.5 | |
| Iron powder (CIP) | | | 1 | | 1 | 1 |
| Thermal aging temperature: | 200° C. | 200° C. | 200° C. | 200° C. | 200° C. | 200° C. |
| Decrease in flexural strength after 1000 h: | −26% | −9% | none | −2% | none | −2% |
| Decrease in flexural strength after 2000 h: | −70% | −43% | −22% | −23% | −23% | −24% |

TABLE 3

| CC/C1 + C2 examples: | 1a) | 2a) | 8a) | 9a) | 11a) | 11b) | 17a) |
|---|---|---|---|---|---|---|---|
| C1 | 1 | 2 | 8 | 9 | 11 | 11 | 17 |
| C2 | | | | | | | |
| PA6 (relative viscosity) | 2.7 | 2.7 | 2.7 | 2.7 | 2.7 | 2.7 | 2.7 |
| Lupasol WF | | 0.5 | 0.5 | 0.5 | 0.5 | 0.5 | 0.5 |
| iron powder (CIP) | | | 1 | 1 | 1 | | |
| Analysis: | | | | | | | |
| Thermal aging temperature (1000 h): | 200° C. | 200° C. | 200° C. | 200° C. | 200° C. | 200° C. | 200° C. |
| Tensile strength (MPa): | 11 | 11 | 16 | 19 | 20 | 18 | 18 |

TABLE 4

| CC/C1 examples | 12 | 13 | 14 | 15 | 16 | 18 |
|---|---|---|---|---|---|---|
| SC: | | | | | | |
| PA66 (relative viscosity) | 2.7 | 2.7 | 2.7 | 2.7 | 2.7 | 2.7 |
| Lupasol WF | | 0.5 | 0.5 | 0.5 | 0.5 | 0.5 |
| Iron powder (CIP) | | | 1 | 1 | 1 | 1 |
| MC: | | | | | | |
| PA66 (relative viscosity) | 2.7 | 2.7 | 2.7 | 2.7 | 2.7 | 2.7 |
| Lupasol WF | | 0.5 | 0.5 | | 0.5 | |
| Iron powder (CIP) | | | 1 | | 1 | 1 |
| Thermal aging temperature: | 220° C. | 220° C. | 220° C. | 220° C. | 220° C. | 220° C. |
| Decrease in flexural strength after 1000 h: | −44% | −35% | none | none | none | none |
| Decrease in flexural strength after 2000 h: | no longer any | −70% | −3% | −5% | −3% | −4% |

TABLE 5

| CC/C1 + C2 examples: | 12a) | 13a) | 13b) | 12b) | 16a) | 16b) | 18a) |
|---|---|---|---|---|---|---|---|
| C1 | 12 | 13 | 13 | 12 | 16 | 16 | 18 |
| C2 | | | | | | | |
| PA6 (relative viscosity) | 2.7 | 2.7 | 2.7 | 2.7 | 2.7 | 2.7 | 2.7 |
| Lupasol WF | | 0.5 | 0.5 | 0.5 | 0.5 | 0.5 | 0.5 |
| Iron powder (CIP) | | | 1 | 1 | 1 | | 1 |

TABLE 5-continued

| CC/C1 + C2 examples: | 12a) | 13a) | 13b) | 12b) | 16a) | 16b) | 18a) |
|---|---|---|---|---|---|---|---|
| Thermal aging temperature (1000 h): | 220° C. | 220° C. | 220° C. | 220° C. | 220° C. | 220° C. | 220° C. |
| Tensile strength (MPa): | 5 | 7 | 5 | 4 | 16 | 11 | 16 |

The invention claimed is:

1. A plastic composite component, comprising
    i) a first plastic component comprising
        ia) a matrix composition comprising a polyamide matrix polymer and a first fiber material for reinforcement, and
        ib) a surface composition which comprises a polyamide surface polymer and a polyethyleneimine that improves thermal aging resistance of the plastic composite component and forms a surface of the first plastic component,
    wherein the matrix composition does not comprise any polyethyleneimine.

2. The plastic composite component according to claim 1, further comprising
    ii) a second plastic component which comprises a polyamide molding polymer and is molded onto the surface of the first plastic component.

3. The plastic composite component according to claim 1, wherein the polyethyleneimine has a weight-average molecular weight $M_w$ of from 600 to 300 000 g/mol.

4. The plastic composite component according to claim 1, wherein the polyethyleneimine comprises primary, secondary and tertiary amino groups, where a ratio of primary to secondary to tertiary amino groups ranges from 1:0.8:0.5 to 1:1.3:0.8.

5. The plastic composite component according to claim 1, wherein the polyethyleneimine is a hyperbranched polymer having a degree of branching DB of from 10% to 99%, where DB is defined as DB (%) =100 x(T+Z)/(T+Z+L) where T is a mean number of terminal-bonded monomer units, Z is a mean number of monomer units that form branches and L is a mean number of linear-bonded monomer units in the polyethyleneimine.

6. The plastic composite component according to claim 1, wherein the plastic composite component comprises 0.01% to 5% by weight of polyethyleneimine, based on a total weight of the plastic composite component.

7. The plastic composite component according to claim 2, wherein the second plastic component comprises the polyethyleneimine.

8. The plastic composite component according to claim 1, wherein the first fiber material is a continuous fiber material.

9. The plastic composite component according to claim 2, wherein the second plastic component comprises a second fiber material, which is a short fiber material.

10. The plastic composite component according to claim 2, wherein at least one of the surface composition and the second plastic component comprises iron powder.

11. A process for producing the plastic composite component according to claim 2, the process comprising:
    a) providing the first plastic component, and
    b) molding the second plastic component onto the surface of the first plastic component,
        wherein
        optionally the second plastic component comprises the polyethyleneimine.

12. The process according to claim 11, wherein, in a), the first plastic component is placed into a mold and, in b), the second plastic component is injected into the mold in a molten state.

13. A process for improving thermal aging resistance of a plastic composite component, the process comprising:
    a) providing a first plastic component comprising
        ia) a matrix composition comprising a polyamide matrix polymer and a first fiber material for reinforcement, and
        ib) a surface composition which comprises a polyamide surface polymer and a polyethyleneimide for improving the thermal aging resistance of the plastic composite component and forms a surface of the first plastic component, and
    b) molding a second plastic component comprising a polyamide molding polymer onto the surface of the first plastic component,
        wherein
        the matrix composition does not comprise any polyethyleneimine.

* * * * *

UNITED STATES PATENT AND TRADEMARK OFFICE
CERTIFICATE OF CORRECTION

| | | |
|---|---|---|
| PATENT NO. | : 10,030,110 B2 | Page 1 of 3 |
| APPLICATION NO. | : 14/913223 | |
| DATED | : July 24, 2018 | |
| INVENTOR(S) | : Gijsbrecht Habraken et al. | |

It is certified that error appears in the above-identified patent and that said Letters Patent is hereby corrected as shown below:

In the Specification

In Column 1, Line 26, "parts" should read -- parts, --, therefor.

In Column 1, Line 45, "thereof," should read -- thereof. --, therefor.

In Column 1, Line 55, "($D_{50}$)," should read -- ($D_{50}$). --, therefor.

In Column 2, Line 45, "halides," should read -- halides. --, therefor.

In Column 3, Line 29, "(TAR)," should read -- (TAR). --, therefor.

In Column 4, Line 52, "short," should read -- short. --, therefor.

In Column 5, Line 67, "capryiolactam" should read -- caprylolactam --, therefor.

In Column 6, Line 4, "ANBB Polymers:" should read -- AA/BB Polymers: --, therefor.

In Column 6, Line 15, "PA 61" should read -- PA 6I --, therefor.

In Column 6, Line 21, "PA 61/6T" should read -- PA 6I/6T --, therefor.

In Column 6, Line 21, "PA 61" should read -- PA 6I --, therefor.

In Column 6, Line 23, "PA 61/6TIPACM" should read -- PA 6I/6T/PACM --, therefor.

In Column 6, Line 23, "PA 61/6T" should read -- PA 6I/6T --, therefor.

In Column 6, Line 25, "12/MACM1" should read -- 12/MACMI --, therefor.

Signed and Sealed this
Twenty-eighth Day of April, 2020

Andrei Iancu
*Director of the United States Patent and Trademark Office*

CERTIFICATE OF CORRECTION (continued)
U.S. Pat. No. 10,030,110 B2

In Column 6, Line 29, "phenyienediamine," should read -- phenylenediamine, --, therefor.

In Column 6, Line 35, "PA 61," should read -- PA 6I, --, therefor.

In Column 6, Line 36, "PA 61/6T," should read -- PA 6I/6T, --, therefor.

In Column 6, Line 37, "61/6T/PACM," should read -- 6I/6T/PACM, --, therefor.

In Column 7, Line 2, "industry," should read -- industry. --, therefor.

In Column 7, Line 57, "(PM)" should read -- (PAA) --, therefor.

In Column 8, Line 27, "(MC)," should read -- (MC). --, therefor.

In Column 9, Line 7, "(CP)," should read -- (CIP), --, therefor.

In Column 9, Line 18, "(CC)," should read -- (CC). --, therefor.

In Column 10, Lines 41-47, "These polymer.......(F1)." should be the same in Column 10, Line 40 as the continuation of same paragraph.

In Column 10, Line 63, "(PAM)," should read -- (PAM). --, therefor.

In Column 11, Line 3, "(F1)," should read -- (F1). --, therefor.

In Column 11, Line 28, "used," should read -- used. --, therefor.

In Column 11, Line 40, "(CC)," should read -- (CC). --, therefor.

In Column 11, Line 41, "0,1% to" should read -- 0.1% to --, therefor.

In Column 11, Line 46, "0,01%" should read -- 0.01% --, therefor.

In Column 11, Line 59, "30%," should read -- 30%. --, therefor.

In Column 12, Line 35 (approx.), "(PE's)," should read -- (PEIs), --, therefor.

In Column 12, Line 37, "(PEIs)," should read -- (PEIs). --, therefor.

In Column 12, Line 57, "polyethyieneimines" should read -- polyethyleneimines --, therefor.

In Column 13, Line 2, "99%," should read -- 99%. --, therefor.

In Column 13, Line 42, "C.," should read -- C. --, therefor.

In Column 13, Line 52, "pentacarbonyi" should read -- pentacarbonyl --, therefor.

CERTIFICATE OF CORRECTION (continued)
U.S. Pat. No. 10,030,110 B2

In Column 13, Lines 53-54, "powder carbonyl iron or" should read -- powder–carbonyl iron–or --, therefor.

In Column 14, Line 2, "pentacarbonyi," should read -- pentacarbonyl, --, therefor.

In Column 14, Line 19, "1,4" should read -- 1.4 --, therefor.

In Column 14, Line 20, "12 um" should read -- 12 μm. --, therefor.

In Column 14, Line 23, "(CP)." should read -- (CIP). --, therefor.

In Column 14, Line 36, "E 1019." should read -- E1019. --, therefor.

In Column 14, Lines 53-54, "Further.....SiO$_2$." should be the same in Column 14, Line 52 as the continuation of same paragraph.

In Column 15, Line 3, "PAAs," should read -- PAAs. --, therefor.

In Column 15, Line 36, "(FAA)." should read -- (PAA). --, therefor.

In Column 16, Line 42, "(CC)," should read -- (CC). --, therefor.

In Column 16, Lines 43-45, "Furthermore,.....(CC)." should be the same in Column 16, Line 42 as the continuation of same paragraph.

In Column 17, Line 12 (approx.), "2.7," should read -- 2.7. --, therefor.

In Column 18, Line 44, "poiyethyleneimine" should read -- polyethyleneimine --, therefor.